United States Patent
Behnke

Patent Number: 5,819,114
Date of Patent: Oct. 6, 1998

[54] INTERRUPPTION RECOVERY AND RESYNCHRONIZATION OF EVENTS IN A COMPUTER

[75] Inventor: Eric J. Behnke, Boulder, Colo.

[73] Assignee: National Semiconductor Corporation, Santa Clara, Calif.

[21] Appl. No.: 698,671

[22] Filed: Aug. 15, 1996

[51] Int. Cl.$^6$ .......................... G06F 13/40; G06F 13/376
[52] U.S. Cl. .......................... 395/877; 395/876; 395/889
[58] Field of Search ................................. 395/438, 877, 395/889, 677, 876, 806, 501, 309, 152.16; 370/280, 334, 344, 341, 384; 364/DIG. 1, DIG. 2; 375/219

[56] References Cited

U.S. PATENT DOCUMENTS

| 5,388,261 | 2/1995 | Anderson et al. | 395/677 |
| 5,392,396 | 2/1995 | MacInnis | 395/509 |
| 5,517,521 | 5/1996 | Strawn | 375/219 |

Primary Examiner—Daniel H. Pan
Attorney, Agent, or Firm—John L. Maxin

[57] ABSTRACT

A computer system employs systems and methods that are transparent to the operating system and application programs, for interruption recovery and resynchronization of events including a playback FIFO buffer having an underrun counter that counts the number of audio samples that could not be read from the playback FIFO buffer because the playback FIFO buffer was empty. When the playback FIFO buffer goes empty, an interrupt is asserted to signal the processor to read the underrun counter to determine how many samples it missed and to advance its pointers forward to "re-sync" the data stream. The computer system further preferably includes a capture FIFO buffer to capture samples from an ADC and having an overrun counter that counts the number of audio samples that could not be written to the capture FIFO buffer because the capture FIFO buffer was full. The capture FIFO buffer generates an interrupt to signal the processor to read the overrun counter to determine how many samples it missed and to fill a record buffer with a number of samples equal to the overrun count, wherein each sample has a predetermined value preferably equal to the value of the last input before overrun.

20 Claims, 4 Drawing Sheets

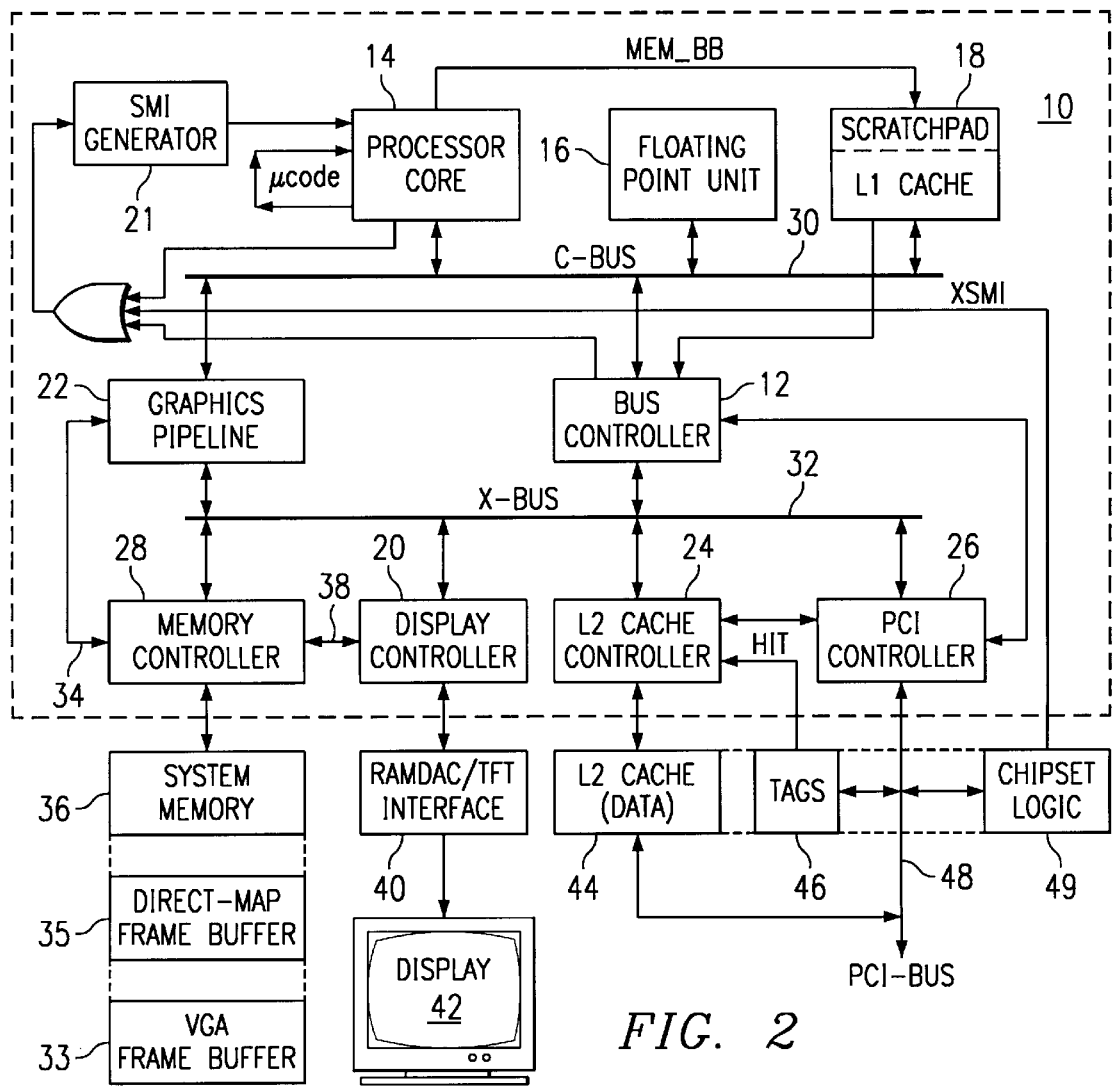
FIG. 2
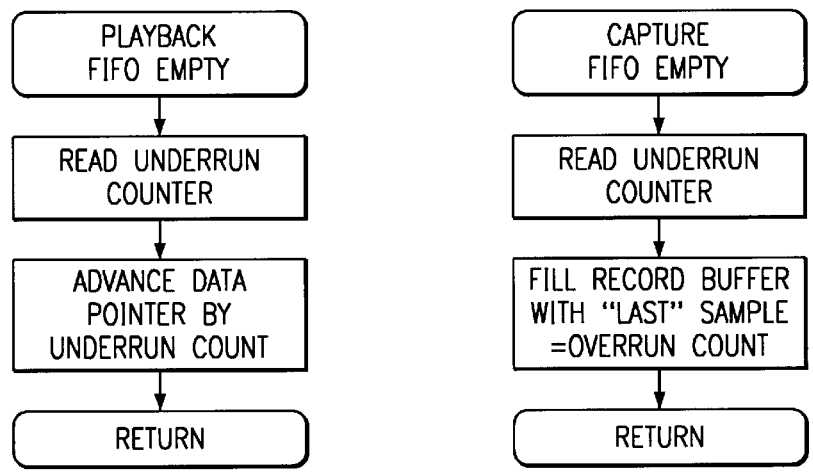
FIG. 6
FIG. 7

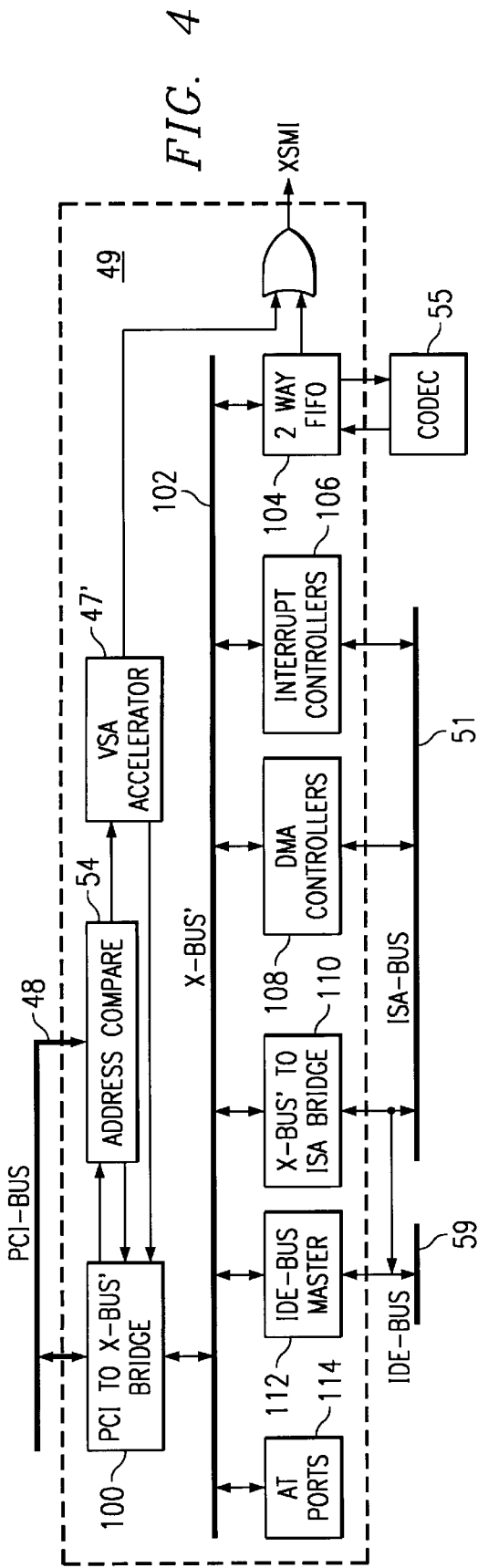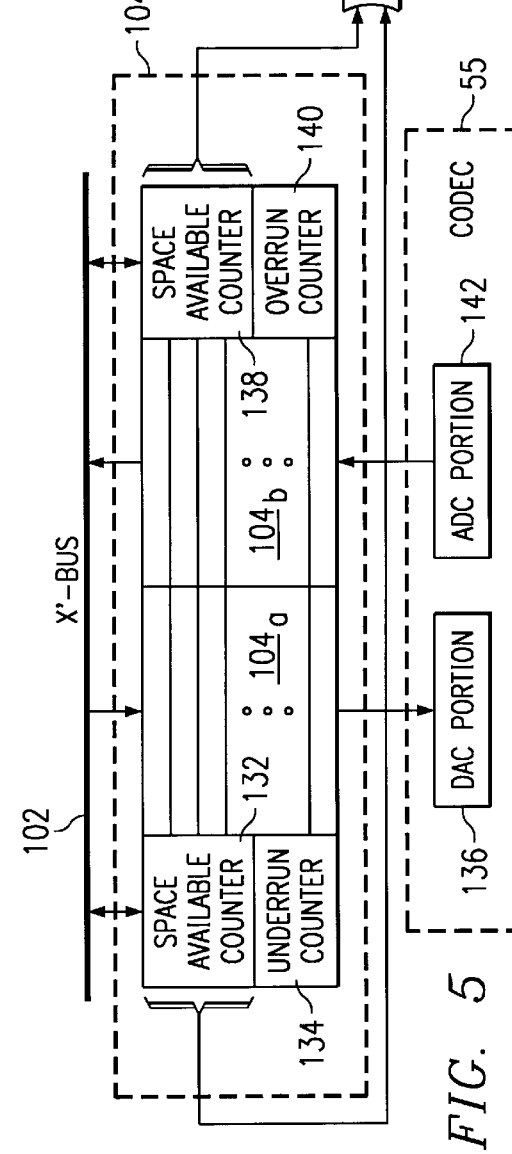

INTERRUPTION RECOVERY AND RESYNCHRONIZATION OF EVENTS IN A COMPUTER

CROSS-REFERENCES TO RELATED APPLICATIONS

This patent application is related to commonly assigned U.S. patent applications Ser. No. 08/458,326 (Docket No: CX00230), entitled "Virtualized Audio Generation And Capture In A Computer", filed Jun. 29, 1995, now abandoned, and Ser. No. 08/540,351 (Docket No: CX00253), entitled "Virtual Subsystem Architecture" filed Oct. 06, 1995, the disclosures of both herein incorporated by reference.

BACKGROUND OF THE INVENTION

1. Field of the Invention

The invention broadly relates to issues in multi-tasking/multi-threaded computer systems, and more specifically to systems and methods of interruption recovery and synchronization of an event such as an audio-visual event, when a task or tasks encroach upon a critical time frame for processing the event.

2. Description of Related Art

Playback or capture of hi-fidelity compact disc (CD) quality digital audio in a personal computer (PC) is a very demanding process requiring a digital data stream of one-hundred-seventy-two Kilobits per second—usually demanding additional resources other than the main processor. The basic operation for digital audio playback involves transferring digital data from some type of storage medium (e.g. a hard disk, CD, RAM, or ROM) to a digital to analog converter (DAC) which translates the data into analog audio signals. Typically, sound cards, such as but not limited to the Sound Blaster™ card from Creative Labs Corporation of Milpitas, Calif., have dedicated hardware which is programmed by the main processor to generate sound. The sound card may include a co-processor, typically in the form of a digital signal processor (DSP), to manage the overhead associated with digital audio playback and capture. In addition, direct-memory-access (DMA) devices are sometimes used in conjunction with the sound card to further alleviate the main processor from having to constantly provide the digital data stream to the sound card.

The Assignee of the present invention have pioneered a revolutionary new concept known as a virtual subsystem architecture (VSA) described in commonly assigned U.S. patent application Ser. No. 08/540,351 (Docket No: CX00253), entitled "Virtual Subsystem Architecture" filed Oct. 06, 1995, the disclosure having been incorporated by reference, which eliminates, inter alia, the need for a sound card. Moreover, U.S. patent application Ser. No. 08/458,326 entitled "Virtualized Audio Generation And Capture In A Computer", filed Jun. 29, 1995, now abandoned, assigned to the Assignee of the present invention and herein incorporated by reference, further describes a "virtual sound card" with the use of incoming and outgoing First-In-First-Out (FIFO) buffers to receive and temporarily store digital samples coming from an analog-to-digital converter (ADC) or DAC, respectively.

In playback, the outgoing FIFO holds audio data that is to be sent to the DAC and if the level of buffered data falls below a predetermined threshold an indicator is asserted to the processor to request that more data be written to outgoing FIFO buffer. A drawback occurs however, if the request is not timely serviced and the outgoing FIFO buffer goes empty causing the audio data stream to "drift" relative to a time-base in use by the computer system which may be playing video. Consequently, the audio portion of an audio-visual presentation will be out of sync with the video portion.

Similarly in capture, the incoming FIFO buffer holds audio data received from the ADC and if the buffered data rises above a predetermined threshold, an indicator is asserted to the processor to request that the incoming FIFO buffer be emptied. If the data read request is not timely serviced, the incoming FIFO buffer overflows causing the audio data stream to be lost.

An example of where the outgoing and incoming thresholds may not be timely serviced is under a multi-tasking operating system (O/S). Despite efforts by the O/S to prioritize and execute multiple tasks without undue delay, nested interruptions can accumulate to a point where audio playback and capture data is out of sync or lost with respect to other system events. Consequently, interruptions during audio playback can rise to a level that sound is out of sync with respect to corresponding video presentation. Existing sound cards do not provide a mechanism that recognizes the ramifications of these unintended interruptions nor do they re-synchronize the audio to the corresponding video stream.

U.S. Pat. No. 5,388,261, issued Feb. 7, 1995, to Anderson et al. describes a system which employs a DSP for audio processing and a method to combat the aforementioned synchronization problem relying on, inter alia, intervention from the application program that produces the audio stream. One of several drawbacks with Anderson et al. is that relying on the application program to recover from interruptions gives up compatibility with existing legacy software.

It can be seen from the foregoing therefore, that there is a need in a mult-tasking environment, for a system and method to recover from unintended interruptions and to synchronize digitized events without intervention from the underlying application programs.

SUMMARY OF THE INVENTION

To overcome the limitations of the prior art described above, and to overcome other limitations that will become apparent upon reading and understanding the present specification, the present invention discloses a system and method in a computer system, transparent to an operating system and application programs running underneath, for interruption recovery and resynchronization of events which includes a playback FIFO buffer having an underrun counter that counts the number of audio samples that could not be read from the playback FIFO buffer because the playback FIFO buffer was empty. When the playback FIFO buffer goes empty, an interrupt is asserted to signal the processor to read the underrun counter to determine how many samples it missed and to advance its pointers forward to "re-sync" the data stream. The computer system further preferably includes a capture FIFO buffer to capture samples from an ADC and having an overrun counter that counts the number of audio samples that could not be written to the capture FIFO buffer because the capture FIFO buffer was full. The capture FIFO buffer generates an interrupt to signal the processor to read the overrun counter to determine how many samples it missed and to fill a record buffer with samples having a value preferably although not exclusively, equal to the value of the last input before overrun.

The playback FIFO buffer preferably includes a space available counter to indicate if the playback FIFO buffer is empty or alternatively, the number of valid samples it contains. The capture FIFO buffer preferably includes a space available counter to indicate if the capture FIFO buffer is full or alternatively, the number of it entries which are unused.

A feature of the present invention is the ability to recover from interruption in a multi-tasking system and to re-sync audio capture and playback transparently from the O/S.

Another feature of the present invention is the ability to recover from interruption in a multi-tasking system and to re-sync audio capture and playback transparently or without maintaining protocol with application programs.

Another feature of the present invention is the ability to recover from interruption in a multi-tasking system and to re-sync audio capture and playback while maintaining compatibility with legacy software.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a system and method of interruption recovery and synchronization of events in a multi-tasking system, in accordance with the principles of the present invention.

BRIEF DESCRIPTION OF THE DRAWINGS

FIG. 2 is a more detailed block diagram of pertinent portions of the computer system depicted in FIG. 1;

FIG. 4 is a more detailed block diagram of the chipset logic circuitry depicted in FIG. 2;

FIG. 5 is a more detailed block diagram of the 2 Way FIFO depicted in FIG. 4;

FIG. 6 is a flow diagram of the steps taken for interruption recovery and synchronization of audio playback, practiced in accordance with the principles of the present invention; and, FIG. 7 is a flow diagram of the steps taken for interruption recovery and synchronization of audio capture, practiced in accordance with the principles of the present invention.

DESCRIPTION OF THE PREFERRED EMBODIMENT

Figure 1:
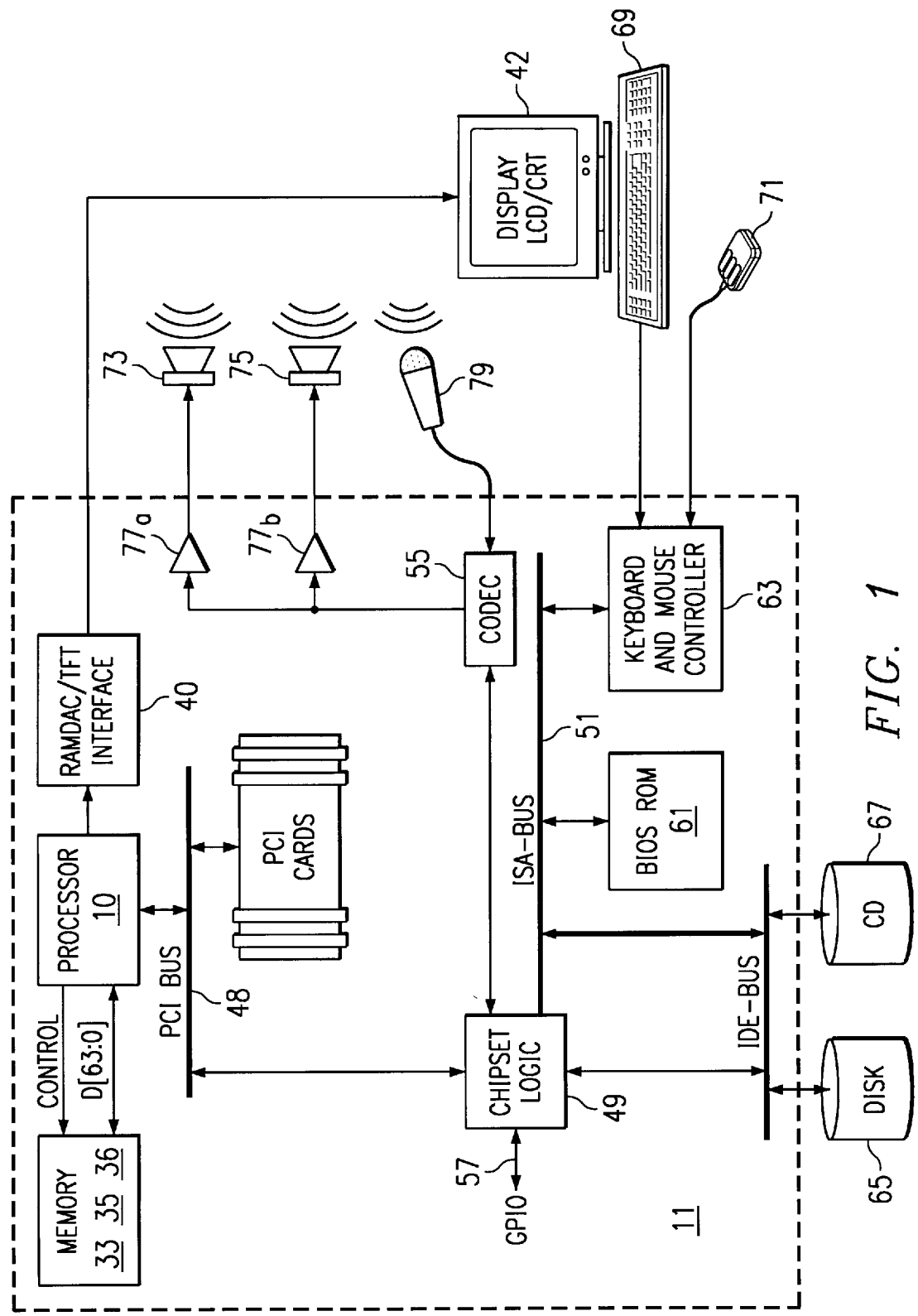
FIG. 1 is an exemplary, but not exclusive, block diagram of a computer system employing interruption recovery and synchronization of events, practiced in accordance with the principles of the present invention.

The detailed description of the preferred embodiment for the present invention is organized as follows:
1. Exemplary System Employing A Virtual Subsystem Architecture
   1.1 General System Overview
   1.2 Block Diagram Of Preferred Processor
2. Exemplary Reentrant System Management Mode Mechanism
3. Event Trapping In A Pipelined Core
4. Chipset Logic Circuitry
5. FIFO Buffer Circuitry
   5.1 Playback
   5.2 Capture
6. Conclusion This organizational table, and the corresponding headings used in this detailed description, are provided for the convenience of reference only and are not intended to limit the scope of the present invention.

It is to be understood that while the preferred embodiment is described hereinbelow with respect to the x86 computer architecture, it has general applicability to any architecture. Certain terminology related to the x86 computer architecture (such as register names, signal nomenclature, etc.) which are known to practitioners in the field of microprocessor design, are not discussed in detail in order not to obscure the disclosure.

Moreover, structural details which will be readily apparent to those skilled in the art having the benefit of the description herein have been illustrated in the drawings by readily understandable block, state, and flow diagrams, showing and describing details that are pertinent to the present invention. Thus, the illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

Throughout the specification, it is to be understood that the term "handler" is used to describe a convenient functional program module that is executed by the processor. It is also to be understood that a condition, event, or method of implementation of a function being "transparent to an application program" describes that the application program neither knows nor needs to know of the condition, event, or method of implementation of a function to execute properly. It should also be understood that the term "control registers" is used throughout the specification to describe a mechanism for holding programmable values to select control, program, and data flow. Those skilled in the art, with the aid of the present disclosure, will recognize many forms and locations for control registers without departing from the scope of the present invention. The term "virtualize" is intended to mean simulation of properties expected of a device or subsystem responsive to an application program, without the actual presence of the device or subsystem, transparent to the application program. The terms "isochronous" or "real-time run" are intended to describe devices or subsystems having a temporal criticality associated with them for proper operation.

1. Exemplary Computer System Employing A Virtualized Display Subsystem

1.1 General System Overview

Reference is now made to FIG. 1 which depicts an exemplary, but not exclusive, block diagram of a computer system employing an virtual subsystem architecture practiced in accordance with the principles of the present invention. A system circuit board (a.k.a. motherboard) 11 includes a processor 10 coupled over sixty-four bit data lines and associated control lines to memory 33, 35, and 36 (detailed in FIG. 2) through its integral memory controller 28 (also detailed in FIG. 2). The processor 10 is further coupled through its integral display controller 20 (FIG. 2) to either a thin film transistor (TFT) display panel interface or RAM- DAC 40 and to a display 42 (either LCD or Cathode Ray Tube, respectively). The processor 10 further provides an externally assessable PCI-Bus 48 through its integral PCI controller 26 (FIG. 2). Additional PCI peripherals cards (e.g. modem, DVD, or extended graphics) may be attached to the PCI-bus 48. Chipset logic circuitry 49 acting as a so-called "south bridge" couples the processor 10 over the PCI bus 48 to a ISA-Bus 51, an IDE-Bus 59, an audio codec 55, and provides general purpose I/O (GPIO) pins 57.

The ISA-Bus 51 maintains compatibility with industry standard peripherals, including but limited to, BIOS ROM 61 and keyboard/mouse controller 63. The keyboard/mouse controller 63 interfaces the ISA-Bus 51 to a keyboard 69 and a mouse 71. Chipset logic circuitry 49 (described in more detail hereinbelow) provides an IDE bus master (FIG. 4) to control two or more mass storage devices off of the IDE-Bus 59 such as, but not limited to, a hard disk drive 65 and CD ROM player 67.

The audio codec 55 provides digital-to-analog conversion to drive left and right speakers 73 and 75 through stereo amplifier 77$_a$–77$_b$, respectively. It should be understood that codec 55 and amplifier 77 could be expanded to more channels without departing from the scope of the present invention. The audio codec 55 also provides analog-to-digital conversion for analog signals originating, for example, from microphone 79. Analog signals could originate from other sources such as, but not limited to, line outputs from a CD player or a VCR (neither shown) without departing from the scope of the present invention.

A multi-tasking operating system program such as Microsoft® Windows™ or derivatives thereof preferably executes on the processor 10 to manage primary operations.

1.2 Block Diagram Of Preferred Processor

Reference is now made to FIG. 2 which depicts a more detailed block diagram of pertinent portions of the computer system depicted in FIG. 1.

The processor 10 preferably includes the following functional units: an internal bus controller 12, a processor core 14, a (level-one) L1 cache 18—part of which is partitionable as a scratchpad memory, a memory controller 28, a floating point unit (FPU) 16, a display controller 20, an internal SMI generator 21, a graphics pipeline (a.k.a. graphics accelerator) 22, a (level-two) L2 cache controller 24, and a PCI-bus controller 26.

The bus controller 12, the processor core 14, the FPU 16, the L1 cache 18, and the graphics pipeline 22, are coupled together through an internal (with respect to the processor 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the processor 10) X-bus 32. The details of the C-bus 30 and X-bus 32 are not necessary for the understanding of the present invention. It is sufficient to understand that independent C and X buses 30 and 32 de-couple these functional units within the processor 10 so that for example, the processor core 14, the FPU 16, and L1 cache 18 can operate substantially autonomously from the remainder of the processor 10 and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the processor core 14 is performing an unrelated operation.

The processor core 14 in the preferred embodiment employs a six stage pipeline. The exact details of the processor core 14 pipe stages however, are not important for the understanding of the present invention. It is sufficient to understand that a plurality of bytes are fetched into a buffer during the instruction fetch (first) stage, decode and scoreboard checks are performed during the instruction decode (second) stage, linear memory address calculations are performed during a pre-address calculation (third) stage, physical address calculations are performed during an address translation (fourth) stage, instructions are executed during the execution (fifth) stage, and the results of the instruction execution are written to write buffers during the writeback (sixth) stage. Those skilled in the art, with the aid of the present disclosure, will recognize other numbers of stages for the pipeline and other configurations for the processor core 14 without departing from the scope of the present invention.

The L1 cache 18 is preferably, although not exclusively, a 16K byte unified data/instruction cache that operates in either a write-through or write-back mode. An area of the L1 cache 18 can be programmably partitioned as the scratchpad memory through configuration control registers (not shown) in the processor core 14. Scratchpad control circuitry in the L1 cache 18 includes data pointers which can be used by either the processor core 14 or the graphics pipeline 22 to access data in the scratchpad memory. The scratchpad memory may also be addressed directly by the processor core 14.

An exemplary, but not exclusive, use for the scratchpad memory is as a blit buffer for use by the graphics pipeline 22. More specifically, whenever data is moved on the display 42, a raster line (scanline) or portion thereof, of data is read from the direct-mapped frame buffer 35 (preferably in system memory 36), written to the blit buffer partitioned out of the L1 cache 18, and then read back out and written to another region of the direct-mapped frame buffer 35. Programs executed by the processor core 14 can also directly put data into the blit buffer and have the graphics pipeline 22 autonomously read it out and put it in the direct-mapped frame buffer 35.

The preferred L1 cache 18, along with other exemplary applications for the scratchpad memory, are described in co-pending U.S. patent application Ser. No.: 08/464,921, filed Jun. 05, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate from the L1 cache 18 without departing from the scope of the present invention.

The graphics pipeline 22 is coupled to the memory controller 28 through a dedicated bus 34 that expedites block moves of data from the scratchpad memory (blit buffer) to the VGA frame buffer 33 and to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to a control register (not shown) in the processor core 14 which specifies: i) the type of source data required, if any, frame buffer, or blit buffer; ii) the type of destination data required, if any, frame buffer, or blit buffer; iii) where the graphics pipeline 22 writes the data, direct-mapped frame buffer 35, or system memory 36, and iv) a source expansion flag. When the source is an image in system memory 36, the data is loaded from system memory 36 into the blit buffer before starting the BitBlt operation. Destination data is also loaded into the blit buffer when the graphics pipeline 22 renders to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a fast link 38, retrieves image data from the direct-mapped frame buffer memory 35, performs a color look-up if required, inserts cursor and icon overlays into a pixel data stream, generates timing, and formats the pixel data for output to the RAMDAC/Thin Film Transistor (TFT) interface 40 which in turn drives a display 42.

The L2 cache controller 24 and PCI controller 26 collectively provide, inter alia, a high speed interface for an "off-chip" L2 cache 44 (with respect to the processor 10). The preferred, although not exclusive, L2 cache interface is described in co-pending U.S. patent application Ser. No.: 08/522,219, filed Aug. 31, 1995, now abandoned, entitled "L2 Cache Interface", assigned to the Assignee of the present invention and herein incorporated by reference. It is to be understood however, that other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the cache tag and control logic circuitry 46, such as, but not limited to, integrated circuitry onto the processor 10, without departing from the scope of the present invention.

In the preferred embodiment, the exemplary SMI generator 21 receives a first input from the processor core 14, a second input from the internal bus controller 12, and a third input (XSMI) from a source external to the processor 10, preferably in the chipset logic circuitry 49. Those skilled in the art will recognize other forms for the SMI generator 21 and other inputs to the SMI generator 21 without departing from the scope or spirit of the present invention.

Chipset logic circuitry 49, described in more detail hereinbelow, is coupled to the PCI-bus 48 and preferably has interface circuitry including, but not limited to, FIFO buffers for receiving incoming and outgoing data and indicators to indicate fullness of a given buffer. The chipset logic circuitry 49 preferably may also includes comparators, timers, and other trap-like circuitry to detect and indicate the occurrence of predetermined events outside the processor 10.

2. Exemplary Reentrant System Management Mode Mechanism

The preferred embodiment of the present invention supports a reentrant system management mode (SMM) mechanism which is a supervisory operating mode with multiple threads of execution, entered in response to a high priority system management interrupt (SMI). The SMI generator 21 generates an SMI responsive to the occurrence of several events, described in more detail hereinbelow. An exemplary, but not exclusive reentrant SMM, is disclosed in pending U.S. patent application Ser. No.: 08/541,359 entitled "Enhanced System Management Mode With Nesting", Attorney's Docket No. CX-00258, assigned to the Assignee of the present invention, and herein incorporated by reference. Those skilled in the art will recognize other forms of reentrant SMM without departing from the scope of the present invention. For purposes of the present invention, it is sufficient to understand that the reentrant SMM mechanism permits programs under the virtual subsystem architecture time-division-multiple-access (TDMA) and/or demand driven access to the processor core 14 for execution on a hierarchical basis.

3. Event Trapping In A Pipelined Core

Figure 3:
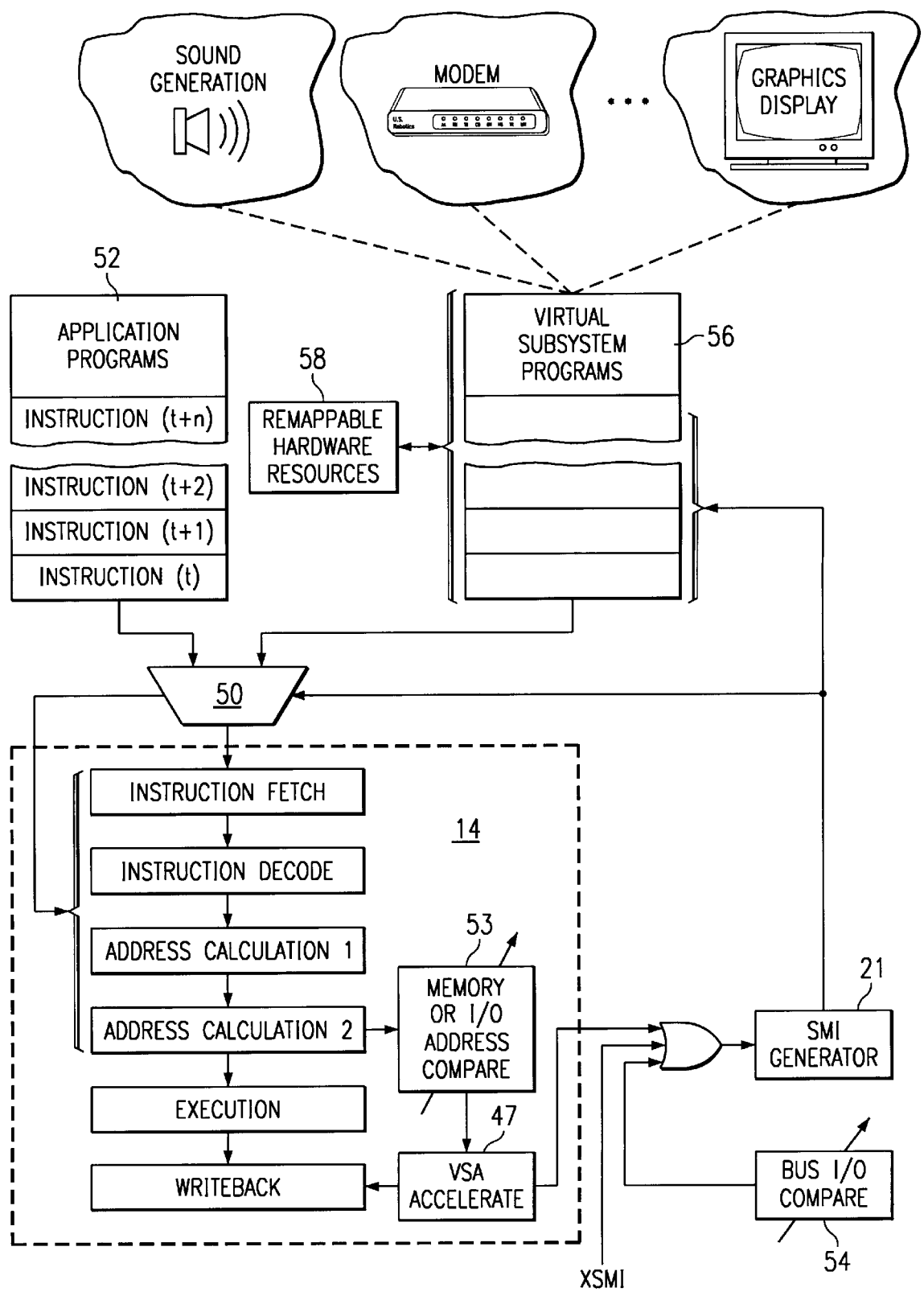
FIG. 3 is a block diagram of an accelerated virtual subsystem architecture practiced in accordance with the principles of the present invention.

Reference is now made to FIG. 3 which depicts a more detailed block diagram of the datapath for the virtual subsystem architecture, input conditions for triggering the reentrant SMM mechanism, and the pipelined processor core 14, in accordance with the principles of the present invention. A multiplexer 50 ordinarily routes instructions from the application programs 52 through processor core 14 for execution. As described above, the preferred embodiment for processor core 14 is a six stage pipeline. Physical address calculations performed during the address translation (fourth) stage are compared with programmable address ranges for memory mapped and I/O mapped peripherals by compare circuitry 53. The address ranges for compare circuitry 53 are programmable through control registers (not shown) preferably, although not exclusively, located in the processor core 14.

Assuming Instruction (t) references an address that matches an address in a range programmed in compare circuitry 53 and the address is not effected by VSA accelerate circuitry 47 (described in more detail hereinbelow), an SMI is generated by SMI generator 21 which, among other things, flushes instructions on the pipeline starting with Instruction (t+1) which then resides in the address calculation 2 stage and continuing on back through the instruction fetch stage. Instruction (t) which then resides in the execution stage and Instructions (t−1) et seq. which reside in the Writeback stage, continue on through to the C-bus. Instruction (t) is preferably quashed by bus controller 12 (depicted in FIG. 2).

The output of compare circuitry 53 in the processor core 14 is coupled to an input on VSA accelerate circuitry 47. VSA accelerate circuitry 47 provides a first conditional SMI input to SMI generator 21. VSA accelerate circuitry 47 and VSA accelerate circuitry 47' are described in more detail in co-pending, commonly assigned U.S. patent application Ser. No. 08/698,670 (Docket No: CX00286), entitled "Accelerated Virtual Subsystem Architecture" filed contemporaneously herewith, the disclosure of which is herein incorporated by reference. The conditions for VSA accelerate circuitry 47 asserting the first SMI input are described in more detail hereinbelow. A second input to the SMI generator circuitry 21 is coupled to an external SMI input (XSMI), which for example, as described above, may be asserted by the chipset logic circuitry 49 to indicate that an input buffer is full. Alternatively, as described in more detail hereinbelow, the XSMI input may be asserted by alternative VSA accelerate circuitry 47' residing in the chipset logic circuitry 49. Note that alternative VSA accelerate circuitry 47' is represented with a prime. A third input to the SMI generator circuitry 21 is coupled to Bus I/O compare circuitry 54 (preferably located in the internal bus controller 12 of FIG. 2) which can detect I/O accesses at the C-bus 30 level. The address ranges for alternative VSA accelerate circuitry 47' and Bus I/O compare circuitry 54 are also programmable through control registers (not shown) however preferably located in the chipset logic circuitry 49 and internal bus controller 12, respectively.

Upon the assertion of one of the three inputs to SMI generator 21, the SMI generator 21 invokes a handler to: i) determine the source of the SMI; ii) point to the appropriate entry address in the virtual subsystem programs 56; iii) flush the application program instructions in pipe stages one through five of the processor core 14; and iv) switch multiplexer 50 to route the selected virtual subsystem program into the processor core 14 for execution. Accordingly, the handler provides a software decode mechanism, allowing additional virtual systems to be easily added.

The virtual subsystem programs 56 may be assisted with remappable virtual hardware resources 58. Remappable hardware resources 58 may include, but are not limited to, a CODEC, a timer, a comparator, and a counter, preferably shared on a TDMA basis among the virtual subsystem programs. That is, instead of duplicating hardware resources for each individual virtual subsystem, a resource may be mapped (through control registers or software program initiated control) to assist the virtual subsystem currently being executed.

According to principles of reentrancy and isochronous "real-time run" virtualization in the present invention, the program which is virtualizing a modem can reenter itself, interrupt the programs virtualizing sound generation or graphics display, or resume the application programs. Similarly, the program which is virtualizing sound generation can reenter itself, interrupt the program virtualizing the graphics display, or resume the application programs. Lastly, the program which is virtualizing a graphics display can reenter itself or resume the application programs. It should be understood that the exemplary reentrancy just described is but one of many examples for which the invention may be practiced. Those skilled in the art will recognize other number of subsystems and hierarchies without departing from the scope or spirit of the present invention.

4. Chipset Logic Circuitry

Reference is now made to FIG. 4 which depicts a more detailed block of the chipset logic circuitry 49 practiced in accordance with the principles of one embodiment of the present invention. PCI to X-Bus' Bridge circuitry 100 bridges the external PCI-Bus 48 to the internal X-Bus' 102 (with respect to chipset logic circuitry 49). It should be noted that X-Bus' 102 can be thought of as an external extension of X-Bus 32 (internal to processor 10). Accordingly, it is contemplated that some or all of the functional block circuitry coupled to X-Bus' 102 in FIG. 4 may be integrated directly into the processor 10 without departing from the scope of the present invention.

Bus I/O compare circuitry 54 is coupled to the PCI-bus 48 and monitors for selected addresses (determined by programmed control registers) similar to memory or I/O address compare circuitry 53 located in the processor core 14. It should be understood that only circuitry 53 or 54 singularly, is required for the present invention. However for completeness, two preferred embodiments are presented—a first which involves integrating the improved circuitry into the processor core 14 and a second which resides in the chipset logic circuitry 49 and relies on external bus cycles (with respect to the processor 10), both described in more detail hereinbelow.

Likewise, VSA accelerate circuitry 47' is similar to VSA accelerate circuitry 47 located in the processor core 14. The primary advantage of locating the improved circuitry of the present invention in the chipset logic circuitry 49 is less interference with processor core 14 operation and less constraint on the die space of the processor 10. On the other hand, locating the improved circuitry of the present invention in the processor core 14 avoids the latency of cycles over the PCI-Bus 48 which are required to access circuitry in chipset logic circuitry 49.

A two-way FIFO 104 preferably, although not exclusively, has thirty-two or less/more entries—each thirty-two bits wide, and is coupled to the codec 55. The two-way FIFO 104 buffers incoming and outgoing data from/to the codec 55. Programmable interrupt controllers 106 are coupled between the ISA-Bus 51 and the X-Bus' 102 for handling interrupt requests from either the PCI-Bus 48 or the ISA-Bus 51. In the preferred embodiment, programmable interrupt controllers 106 are compatible with 8259 interrupt controllers from Intel Corporation of Santa Clara, Calif. DMA controllers 108 are coupled between the ISA-Bus 51 and the X-Bus' 102 for controlling direct memory accesses from I/O devices on the ISA-Bus 51 to memory on either the PCI-Bus 48 or the ISA-Bus 51. In the preferred embodiment, DMA controllers 108 are compatible with 8237 DMA controllers from Intel Corporation of Santa Clara, Calif. X-Bus'-to-ISA bridge 110 bridges the external ISA-Bus 51 to the internal X-Bus' 102 of chipset logic circuitry 49. IDE bus master 112 may interface and master at least two peripherals on the IDE-Bus 59, typically a hard disk drive 65 (FIG. 1) and a CD-ROM 67 (FIG. 1). AT ports 114 provide compatibility circuitry to support, inter alia, a math coprocessor, keyboard controller, fast processor reset, NMI/speaker control interface.

5. FIFO Buffer Circuitry

Reference is now made to FIG. 5 which depicts a more detailed block diagram of the 2 Way FIFO 104 depicted in FIG. 4. At the outset, it should be understood that while the 2-way FIFO 104 is depicted as being embodied external to the processor 10 in chipset logic circuitry 49, it could also be integral to the processor 10 such as but not limited to a module attached to the X-Bus 32 without departing from the scope of the present invention. The FIFO 104 is bifurcated into an outgoing (playback) portion $104_a$ and an incoming (capture) portion $104_b$. The playback portion $104_a$ and the capture portion $104_b$ each preferably include thirty-two, 16-bit, stereo entries for storing outgoing or incoming samples, respectively. Those skilled in the art will appreciate other depths and widths for the FIFO 104 without departing from the scope of the present invention.

5.1 Playback

In conjunction with FIG. 5, reference is now further made to FIG. 6 which depicts a flow diagram of the steps taken for interruption recovery and synchronization of audio playback. The playback portion $104_a$ of FIFO 104 includes a space available counter 132 to indicate how many of its entries contain valid outgoing samples or alternatively, whether the playback portion $104_a$ of FIFO 104 is empty. Preferably, the space available counter 132 is a six-bit counter to identify all thirty-two entries of the playback portion $104_a$. An underrun counter 134 counts the number of samples which were unavailable when requested by the DAC portion 136 of the codec 55 (preferably at a rate of 44,100 Hz). The underrun counter 134 is preferably an eight-bit counter whose count ranges from zero to two-hundred-fifty-five. The underrun counter 134 saturates at a count of two-hundred-fifty-five remaining there until the count is read. A saturated count indicates the occurrence of an abnormally long interruption—recoverable through reset.

As mentioned above, the DAC portion 136 of codec 55 preferably over-samples at a rate of 44,100 Hz—requiring a sample from the playback portion $104_a$ of the FIFO 104 every twenty-two microseconds. Since the underrun counter 134 can count two-hundred-fifty-five "missed" samples, recovery from an interruption having a duration of up to roughly five milliseconds (255·22 $\mu$s) is possible without losing sync. It should be understood with the aid of the present disclosure however, that those skilled in the art will consider other depths for FIFO 104 and resolutions for underrun counter 134 to accommodate interruptions of other durations without departing from the scope of the present invention.

Space available counter 132 asserts a "FIFO empty" XSMI to indicate to the processor 10 that the playback portion $104_a$ of FIFO 104 is empty. Responsive to the "FIFO empty" XSMI being asserted, an SMM handler reads the underrun counter 134 to determine how many output samples were missed as a result of the unduly long interruption. If the count is other than saturation, the SMM handler advances its data pointers forward by the count value held in the underrun counter 134 to "re-sync" the outgoing data stream to the DAC portion 136 of codec 55.

5.2 Capture

In conjunction with FIG. 5, reference is now further made to FIG. 7 which depicts a flow diagram of the steps taken for interruption recovery and synchronization of audio capture. The capture portion $104_b$ of FIFO 104 includes a space available counter 138 to indicate how many of its entries contain valid incoming samples or alternatively, whether the capture portion $104_b$ of FIFO 104 is full. Preferably, the space available counter 138 is a six-bit counter to identify all thirty-two entries of the capture portion $104_b$ of FIFO 104. An overrun counter 140 counts the number of samples which overran the available space in the capture portion $104_b$ of FIFO 104. The overrun counter 140 is preferably an eight-bit counter whose count ranges from zero to two-hundred-fifty-five. The overrun counter 140 saturates at a count of two-hundred-fifty-five remaining there until the count is read. A saturated count indicates the occurrence of an abnormally long interruption—recoverable through reset.

The ADC portion 142 of codec 55 preferably over-samples at a rate of 44,100 Hz—requiring a sample from the capture portion $104_b$ of the FIFO 104 every twenty-two microseconds. Since the overrun counter 140 can count two-hundred-fifty-five "missed" samples, recovery from an interruption having a duration of up to roughly five milli-seconds (255·22 $\mu$s) is possible without losing sync. It should be understood however with the aid of the present disclosure, that those skilled in the art will consider other depths for FIFO 104 and resolutions for overrun counter 140 to accommodate interruptions having other durations without departing from the scope of the present invention.

Space available counter 138 asserts a "FIFO full" XSMI to indicate that the capture portion $104_b$ of FIFO 104 is full. Responsive to the "FIFO full" XSMI being asserted, an SMM handler reads the overrun counter 140 to determine how many input samples were missed as a result of the unexpected interruption. The SMM handler inserts samples into a record buffer having a value preferably although not exclusively, equal to the value of the last input before overrun until it can "re-sync" the incoming data stream from the ADC portion 142 of codec 55 by using the samples from the capture portion $104_b$ of the FIFO 104.

6. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the claims.

What is claimed is:

1. A computer system that transparent to the operating system and application programs recovers from interruption and resynchronizes events comprising:

(a) a processor that executes a plurality of instructions including instructions that produce data for output to a digital to analog converter;

(b) an outgoing FIFO buffer having a plurality of entries coupled to the processor to buffer the data for output to the digital to analog converter and to provide an indicator of whether all of the plurality of entries are empty and a count of requests for data from the digital to analog converter when the outgoing FIFO buffer is empty; and, (c) a system management mode mechanism invokable by the indicator of whether all of the plurality of entries are empty, to feed instructions to the processor for execution to advance data pointers forward by the count of requests for data from the digital to analog converter when the outgoing FIFO buffer is empty to re-sync the data.

2. A computer system as recited in claim 1 further comprising an incoming FIFO buffer having a plurality of entries coupled between an analog to digital converter and the processor, to buffer data received from the analog to digital converter and to provide an indicator of whether all of the plurality of entries are full and a count of requests to write data from the analog to digital converter when the incoming FIFO buffer is full, and wherein the system management mode mechanism is further invokable by the indicator of whether all of the plurality of entries are full, to feed instructions to the processor for execution to fill a record buffer with a number of samples equal to the count of requests to write data, wherein each sample has a predetermined value.

3. A computer system as recited in claim 2 further comprising external chipset logic circuitry coupled to the processor wherein the incoming FIFO buffer resides in the chipset logic circuitry.

4. A computer system as recited in claim 3 wherein the chipset logic circuitry invokes the system management mode mechanism by asserting an external pin coupled to the processor.

5. A computer system as recited in claim 2 wherein the outgoing FIFO buffer and the incoming FIFO buffer are internal to the processor.

6. A computer system as recited in claim 1 further comprising external chipset logic circuitry coupled to the processor wherein the outgoing FIFO buffer resides in the chipset logic circuitry.

7. A computer system as recited in claim 6 wherein the chipset logic circuitry invokes the system management mode mechanism by asserting an external pin coupled to the processor.

8. A computer system as recited in claim 1 wherein the system management mode mechanism is reentrant.

9. A computer system that transparent to the operating system and application programs recovers from interruption and resynchronizes events comprising:
   (a) a motherboard;
   (b) a processor disposed on the motherboard that executes a plurality of instructions including instructions that produce data for output to a digital to analog converter;
   (c) memory disposed on the motherboard and coupled to the processor for storing the plurality of instructions;
   (d) an outgoing FIFO buffer having a plurality of entries coupled to the processor to buffer the data for output to the digital to analog converter and to provide an indicator of whether all of the plurality of entries are empty and a count of requests for data from the digital to analog converter when the outgoing FIFO buffer is empty; and,
   (e) a system management mode mechanism invokable by the indicator of whether all of the plurality of entries are empty, to feed instructions to the processor for execution to advance data pointers forward by the count of requests for data from the digital to analog converter when the outgoing FIFO buffer is empty to re-sync the data.

10. A computer system as recited in claim 9 further comprising an incoming FIFO buffer having a plurality of entries coupled between an analog to digital converter and the processor, to buffer data received from the analog to digital converter and to provide an indicator of whether all of the plurality of entries are full and a count of requests to write data from the analog to digital converter when the incoming FIFO buffer is full, and wherein the system management mode mechanism is further invokable by the indicator of whether all of the plurality of entries are full, to feed instructions to the processor for execution to fill a record buffer with a number of samples equal to the count of requests to write data, wherein each sample has a predetermined value.

11. A computer system as recited in claim 10 further comprising external chipset logic circuitry coupled to the processor wherein the incoming FIFO buffer resides in the chipset logic circuitry.

12. A computer system as recited in claim 11 wherein the chipset logic circuitry invokes the system management mode mechanism by asserting an external pin coupled to the processor.

13. A computer system as recited in claim 10 wherein the outgoing FIFO buffer and the incoming FIFO buffer are internal to the processor.

14. A computer system as recited in claim 9 further comprising external chipset logic circuitry coupled to the processor wherein the outgoing FIFO buffer resides in the chipset logic circuitry.

15. A computer system as recited in claim 14 wherein the chipset logic circuitry invokes the system management mode mechanism by asserting an external pin coupled to the processor.

16. A method transparent to an operating system and application programs, of interruption recovery and resynchronization of events in a computer system comprising the steps of:
   (a) executing a plurality of instructions including instructions that produce data for output to a digital to analog converter;
   (b) buffering the data for output to the digital to analog converter in an outgoing FIFO buffer having a plurality of entries;
   (c) providing an indicator of whether all of the plurality of entries in the outgoing FIFO buffer are empty;
   (d) providing a count of requests for data from the digital to analog converter when the outgoing FIFO buffer is empty; and,
   (e) feeding instructions to the processor for execution to advance data pointers forward by the count of requests for data from the digital to analog converter when the outgoing FIFO buffer is empty to re-sync the data.

17. A method as recited in claim 16 further comprising the steps of:
   (f) buffering incoming data received from an analog to digital converter in an incoming FIFO buffer having a plurality of entries;
   (g) providing an indicator of whether all of the plurality of entries are full;
   (h) providing a count of requests to write data from the analog to digital converter when the incoming FIFO buffer is full; and,
   (i) feeding instructions to the processor for execution to fill a record buffer with a number of samples equal to the count of requests to write data, wherein each sample has a predetermined value.

18. In a computer having a motherboard, a processor, and memory external to the processor, a method of interruption recovery and resynchronization of events transparent to the operating system and application programs comprising the steps of:
   (a) executing instructions from external memory in the processor including instructions that produce data for output to a digital to analog converter;
   (b) buffering the data for output to the digital to analog converter in an outgoing FIFO buffer having a plurality of entries;
   (c) providing an indicator of whether all of the plurality of entries in the outgoing FIFO buffer are empty;
   (d) providing a count of requests for data from the digital to analog converter when the outgoing FIFO buffer is empty; and,
   (e) feeding instructions to the processor for execution to advance data pointers forward by the count of requests for data from the digital to analog converter when the outgoing FIFO buffer is empty to re-sync the data.

19. A method as recited in claim 18 comprising the steps of:
   (f) buffering incoming data received from an analog to digital converter in an incoming FIFO buffer having a plurality of entries;
   (g) providing an indicator of whether all of the plurality of entries are full;
   (h) providing a count of requests to write data from the analog to digital converter when the incoming FIFO buffer is full; and,
   (i) feeding instructions to the processor for execution to fill a record buffer with a number of samples equal to the count of requests to write data, wherein each sample has a predetermined value.

20. Transparent to a multi-tasking operating system and application programs in a computer system, a method of interruption recovery and resynchronization of events comprising steps of:

(a) executing instructions from external memory in the processor under a multi-tasking operating system including instructions that produce data for output to a digital to analog converter;

(b) buffering the data for output to the digital to analog converter in an outgoing FIFO buffer having a plurality of entries;

(c) providing an indicator of whether all of the plurality of entries in the outgoing FIFO buffer are empty;

(d) providing a count of requests for data from the digital to analog converter when the outgoing FIFO buffer is empty; and, (e) feeding instructions to the processor for execution to advance data pointers forward by the count of requests for data from the digital to analog converter when the outgoing FIFO buffer is empty to re-sync the data;

(f) buffering incoming data received from an analog to digital converter in an incoming FIFO buffer having a plurality of entries;

(g) providing an indicator of whether all of the plurality of entries are full;

(h) providing a count of requests to write data from the analog to digital converter when the incoming FIFO buffer is full; and, (i) feeding instructions to the processor for execution to fill a record buffer with a number of samples equal to the count of requests to write data, wherein each sample has a predetermined value.

* * * * *